(12) United States Patent
Colgrove et al.

(10) Patent No.: US 9,507,532 B1
(45) Date of Patent: Nov. 29, 2016

(54) MIGRATING DATA IN A STORAGE ARRAY THAT INCLUDES A PLURALITY OF STORAGE DEVICES AND A PLURALITY OF WRITE BUFFER DEVICES

(71) Applicant: Pure Storage, Inc., Mountain View, CA (US)

(72) Inventors: John Colgrove, Los Altos, CA (US); Lydia Do, San Jose, CA (US); Ethan Miller, Santa Cruz, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 15/159,889

(22) Filed: May 20, 2016

(51) Int. Cl.
G06F 12/00 (2006.01)
G06F 3/06 (2006.01)

(52) U.S. Cl.
CPC .......... *G06F 3/0611* (2013.01); *G06F 3/0656* (2013.01); *G06F 3/0665* (2013.01); *G06F 3/0689* (2013.01)

(58) Field of Classification Search
CPC .. G06F 3/0611; G06F 3/0656; G06F 3/0665; G06F 3/0689; G06F 12/0846; G06F 12/0853
See application file for complete search history.

(56) References Cited

U.S. PATENT DOCUMENTS

| | | | |
|---|---|---|---|
| 5,933,598 | A | 8/1999 | Scales et al. |
| 6,643,641 | B1 | 11/2003 | Snyder |
| 7,089,272 | B1 | 8/2006 | Garthwaite et al. |
| 7,437,530 | B1 | 10/2008 | Rajan |
| 8,437,189 | B1 | 5/2013 | Montierth et al. |
| 8,527,544 | B1 | 9/2013 | Colgrove et al. |
| 8,566,546 | B1 | 10/2013 | Marshak et al. |
| 8,812,860 | B1 | 8/2014 | Bray |
| 9,134,922 | B2 | 9/2015 | Rajagopal et al. |
| 2003/0191783 | A1 | 10/2003 | Wolczko et al. |
| 2004/0111573 | A1 | 6/2004 | Garthwaite |
| 2005/0160416 | A1 | 7/2005 | Jamison |
| 2006/0239075 | A1 | 10/2006 | Williams et al. |

(Continued)

FOREIGN PATENT DOCUMENTS

EP 0725324 A2 8/1996

OTHER PUBLICATIONS

The International Search Report and the Written Opinoin received from the International Searching Authority (ISA/EPO) for International Application No. PCT/US2016/032052, mailed Aug. 30, 2016, 17 pages.

(Continued)

*Primary Examiner* — Shawn X Gu
(74) *Attorney, Agent, or Firm* — Edward J. Lenart; Kennedy Lenart Spraggins LLP

(57) ABSTRACT

Migrating data in a storage array that includes a plurality of storage devices and a plurality of write buffer devices, including: detecting, by the storage array, an occurrence of a write buffer device evacuation event associated with one or more source write buffer devices; responsive to detecting the occurrence of the write buffer device evacuation event, determining, by the storage array, whether the storage array includes at least a predetermined amount of write buffer resources in addition to the one or more source write buffer devices; and responsive to determining that the storage array includes at least a predetermined amount of write buffer resources in addition to the one or more source write buffer devices, reducing, by the storage array, write access to the one or more source write buffer devices.

20 Claims, 7 Drawing Sheets

(56) References Cited

U.S. PATENT DOCUMENTS

| | | | |
|---|---|---|---|
| 2007/0109856 A1 | 5/2007 | Pellicone et al. | |
| 2008/0282045 A1 | 11/2008 | Biswas et al. | |
| 2010/0332754 A1* | 12/2010 | Lai ..................... | G06F 3/0625 |
| | | | 711/118 |
| 2011/0131231 A1 | 6/2011 | Haas et al. | |
| 2012/0023144 A1 | 1/2012 | Rub | |
| 2013/0198459 A1 | 8/2013 | Joshi et al. | |
| 2013/0290607 A1 | 10/2013 | Chang et al. | |

OTHER PUBLICATIONS

Microsoft, "Hybrid for SharePoint Server 2013—Security Reference Architecture", <http://hybrid.office.com/img/Security_Reference_Architecture.pdf> (online), dated Oct. 2014, 53 pages.

Microsoft, "Hybrid Identity", <http://aka.ms/HybrididentityWp> (online), dated Apr. 2014, 36 pages.

Microsoft, "Hybrid Identity Management", <http://download.microsoft.com/download/E/A/E/EAE57CD1-A80B-423C-96BB-142FAAC630B9/Hybrid_Identity_Datasheet.pdf> (online), published Apr. 2014, 17 pages.

Jacob Bellamy-Mcintyre et al., "OpenID and the EnterpriseL A Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.

The International Search Report and the Written Opinoin received from the International Searching Authority (ISA/EPO) for International Application No. PCT/US2016/035492, mailed Aug. 17, 2016, 10 pages.

The International Search Report and the Written Opinoin received from the International Searching Authority (ISA/EPO) for International Application No. PCT/US2016/036693, mailed Aug. 29, 2016, 10 pages.

* cited by examiner

MIGRATING DATA IN A STORAGE ARRAY THAT INCLUDES A PLURALITY OF STORAGE DEVICES AND A PLURALITY OF WRITE BUFFER DEVICES

DESCRIPTION OF EMBODIMENTS

Figure 1:
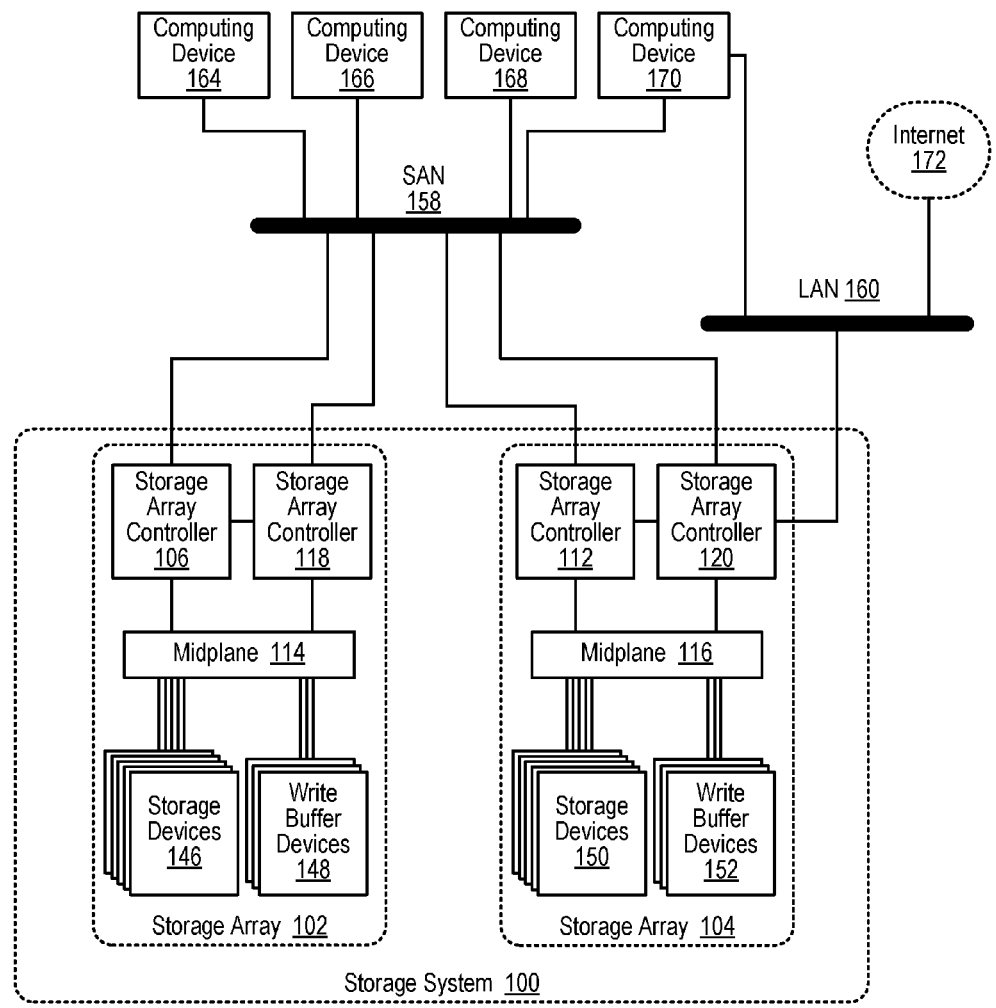
FIG. 1 sets forth a block diagram of a storage system configured for migrating data in a storage array that includes a plurality of storage devices and a plurality of write buffer devices according to embodiments of the present disclosure.

Embodiments of the present disclosure relate to migrating data in a storage array. Such storage arrays may provide persistent data storage for computing devices that are coupled to the storage array via one or more data communications networks. The storage arrays may provide persistent data storage through the use of one or more storage devices such as a solid-state drive ('SSD') and also through the use of one or more write buffer devices. The write buffer devices may be storage devices that include forms of computer memory such as random-access memory ('RAM') that may be written to more quickly than the storage devices. As such, the write buffer devices may serve as a quickly accessible buffer for data that is ultimately destined to be written to one of the storage devices.

Embodiments of the present disclosure may be useful in migrating data in a storage array by detecting an occurrence of a write buffer device evacuation event associated with one or more write buffer devices. The write buffer device evacuation event may indicate that the one or more write buffer devices should no longer be written to as the one or more write buffer devices have been targeted for removal from the storage array. Readers will appreciate that one or more write buffer devices may be targeted for removal from the storage array for a variety of reasons. For example, the more write buffer devices may utilize relatively old memory devices that have a smaller storage capacity than relatively new memory devices that may be available as replacements for the relatively old memory devices. Alternatively, the write buffer devices may utilize relatively old memory devices that have higher access latencies and can't perform as many IOPS as relatively new memory devices that may be available as replacements for the relatively old memory devices. For example, the write buffer devices may include DDR3 DRAM memory devices that can be replaced with DDR4 DRAM memory devices that operate at higher frequencies, lower power consumption levels, and so on. The one or more write buffer devices may therefore be targeted for removal from the storage array as part of an upgrade to the storage array. Readers will appreciate that the one or more write buffer devices may be targeted for removal from the storage array for other reasons, and readers will further appreciate that the one or more write buffer devices may be targeted for removal from the storage array in spite of the fact that the one or more write buffer devices may still be properly functioning with no indication that a failure of the one or more write buffer devices is imminent Embodiments of the present disclosure may be further useful in migrating data in a storage array by determining whether the storage array includes at least a predetermined amount of additional write buffer resources. The additional write buffer resources may be embodied, for example, as write buffer resources provided by one or more write buffer devices that are not associated with the write buffer device evacuation event. The additional write buffer resources therefore represent write buffer resources that are provided by write buffer devices that have not been identified as write buffer devices that are targeted for removal from the storage array. In view of the fact that one or more write buffer devices may be targeted for removal from the storage array as the result of write buffer device evacuation event, the amount of write buffer resources that can be provided by the additional write buffer devices may be compared to a threshold amount of write buffer resources that should be provided to users of the storage array, to verify that the storage array could continue to provide the threshold amount of write buffer resources that should be provided to users of the storage array, even if the one or more write buffer devices that have been targeted for removal from the storage array are actually removed from the storage array. If, in the absence of the one or more write buffer devices that have been targeted for removal from the storage array, the storage array could not continue to provide the threshold amount of write buffer resources that should be provided to users of the storage array, servicing of the write buffer device evacuation event may be delayed or denied.

Embodiments of the present disclosure may be further useful in migrating data in a storage array by includes reducing write access to the one or more write buffer devices that are associated with a write buffer device evacuation event. Reducing write access to the one or more write buffer devices may be carried out, for example, by preventing any additional data from being written to the one or more write buffer devices, by limiting the number of write accesses that may be directed to the one or more write buffer devices to a predetermined value, and so on. Readers will appreciate that by reducing write access to the one or more write buffer devices, the contents of the one or more write buffer devices may become stale over time as all of the data stored in the one or more write buffer devices may be written to the storage devices (e.g., the SSDs) in the storage array. Once the contents of the one or more write buffer devices have become stale and all of the data stored in the one or more write buffer devices is also stored in the storage devices, the one or more write buffer devices may be safely removed from the storage array without resulting in data loss.

Example embodiments of the present disclosure are further described with reference to the accompanying drawings, beginning with FIG. 1. FIG. 1 sets forth a block diagram of a storage system (100) configured for migrating data according to embodiments of the present disclosure.

The storage system (100) depicted in FIG. 1 includes a plurality of storage arrays (102, 104), although migrating data in a storage array that includes a plurality of storage devices and a plurality of write buffer devices in accordance with embodiments of the present disclosure may be carried out in storage systems that include only a single storage array. Each storage array (102, 104) may be embodied as a collection of computer hardware devices that provide persistent data storage to users of the storage system (100). Each storage array (102, 104) may include a collection of data storage devices that are mounted within one or more chassis, racks, or other enclosure. Although not expressly depicted in FIG. 1, each storage array (102, 104) may include a plurality of power supplies that deliver power to one or more components within the storage system (100) via a power bus, each storage array (102, 104) may include a plurality of data communications networks that enables one or more components within the storage system (100) to communicates, each storage array (102, 104) may include a plurality of cooling components that are used to cool one or more components within the storage system (100), and so on.

The example storage arrays (102, 104) depicted in FIG. 1 may provide persistent data storage for computing devices (164, 166, 168, 170) that are coupled to the storage system (100) via one or more data communications networks. Each of the computing devices (164, 166, 168, 170) depicted in FIG. 1 may be embodied, for example, as a server, a workstation, a personal computer, a notebook, a smartphone, a tablet computer, or the like. The computing devices (164, 166, 168, 170) in the example of FIG. 1 are coupled for data communications to the storage arrays (102, 104) through a storage area network ('SAN') (158). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, Small Computer System Interface ('SCSI'), iSCSI, HyperSCSI, and others. Readers will appreciate that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The computing devices (164, 166, 168, 170) depicted in FIG. 1 are also coupled for data communications to the storage arrays (102, 104) through a local area network ('LAN') (160). The LAN (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('IDTP'), Real Time Protocol ('RTP') and others as will occur to those of skill in the art. The LAN (160) depicted in FIG. 1 may be coupled to other computing devices not illustrated in FIG. 1, for example, via the Internet (172). Although only one storage array controller (120) in one storage array (104) is expressly depicted as being coupled to the computing devices (164, 166, 168, 170) via the LAN (160), readers will appreciate that other storage array controllers (106, 112, 118) in any of the storage arrays (102, 104) in the storage system (100) may also be coupled to the computing devices (164, 166, 168, 170) via the same LAN (160) or via a different LAN.

Each storage array (102, 104) depicted in FIG. 1 includes a plurality of storage array controllers (106, 112, 118, 120). Each storage array controller (106, 112, 118, 120) may be embodied as a module of automated computing machinery comprising computer hardware, computer software, or a combination of computer hardware and software. Each storage array controller (106, 112, 118, 120) may be configured to carry out various storage-related tasks such as, for example, writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112, 118, 120) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112, 118, 120) may include, for example, a data communications adapter configured to support communications via the SAN (158) and the LAN (160). Although only one of the storage array controllers (120) in the example of FIG. 1 is depicted as being coupled to the LAN (160) for data communications, readers will appreciate that each storage array controller (106, 112, 118, 120) may be independently coupled to the LAN (160). Each storage array controller (106, 112, 118, 120) may also include, for example, an I/O controller or the like that couples the storage array controller (106, 112, 118, 120) for data communications, through a midplane (114, 116), to a number of storage devices (146, 150), and a number of write buffer devices (148, 152) that are utilized as write caches.

In the example depicted in FIG. 1, the presence of multiple storage array controllers (106, 112, 118, 120) in each storage array (102, 104) can enable each storage array (102, 104) to be highly available as there are independent, redundant storage array controllers (106, 112, 118, 120) that are capable of servicing access requests (e.g., reads, writes) to the storage arrays (102, 104). In some embodiments, each storage array controller (106, 112, 118, 120) in a particular storage array (102, 104) may appear to be active to the computing devices (164, 166, 168, 170) as each storage array controller (106, 112, 118, 120) may be available for receiving requests to access the storage array (102, 104) from the computing devices (164, 166, 168, 170) via the SAN (158) or LAN (160). Although storage array controller (106, 112, 118, 120) may be available for receiving requests to access the storage array (102, 104), however, in some embodiments only one storage array controller (106, 112, 118, 120) may actively be allowed to direct access requests to the storage devices (146, 150) or write buffer devices (148, 152). For ease of explanation, a storage array controller that is allowed to direct access requests to the storage devices (146, 150) or write buffer devices (148, 152) may be referred to herein as an 'active' storage array controller whereas a storage array controller that is not allowed to direct access requests to the storage devices (146, 150) or write buffer devices (148, 152) may be referred to herein as a 'passive' storage array controller. Readers will appreciate that because a passive storage array controller may still receive requests to access the storage array (102, 104) from the computing devices (164, 166, 168, 170) via the SAN (158) or LAN (160), the passive storage array controller may be configured to forward any access requests received by the passive storage array controller to the active storage array controller.

Consider an example in which a first storage array controller (106) in a first storage array (102) is the active storage array controller that is allowed to direct access requests to the storage devices (146) or write buffer devices (148) within the first storage array (102), while a second storage array controller (118) in the first storage array (102) is the passive storage array controller that is not allowed to direct access requests to the storage devices (146) or write buffer devices (148) within the first storage array (102). In such an example, the second storage array controller (118) may continue to receive access requests from the computing devices (164, 166, 168, 170) via the SAN (158) or LAN (160). Upon receiving access requests from the computing devices (164, 166, 168, 170), the second storage array controller (118) may be configured to forward such access requests to the first storage array controller (106) via a communications link between the first storage array controller (106) and the second storage array controller (118). Readers will appreciate that such an embodiment may reduce the amount of coordination that must occur between the first storage array controller (106) and the second storage array controller (118) relative to an embodiment where both storage array controllers (106, 118) are allowed to simultaneously modify the contents of the storage devices (146) or write buffer devices (148).

Although the example described above refers to an embodiment where the first storage array controller (106) is the active storage array controller while the second storage array controller (118) is the passive storage array controller, over time such designations may switch back and forth. For example, an expected or unexpected event may occur that results in a situation where the first storage array controller (106) is the passive storage array controller while the second storage array controller (118) is the active storage array controller. An example of an unexpected event that could cause a change in the roles of each storage array controller (106, 118) is the occurrence of a failure or error condition with the first storage array controller (106) that causes the storage array (102) to fail over to the second storage array controller (118). An example of an expected event that could cause a change in the roles of each storage array controller (106, 118) is the expiration of a predetermined period of time, as the first storage array controller (106) may be responsible for interacting with the storage devices (146) and the write buffer devices (148) during a first time period while the second storage array controller (118) may be responsible for interacting with the storage devices (146) and the write buffer devices (148) during a second time period. Readers will appreciate that although the preceding paragraphs describe active and passive storage array controllers with reference to the first storage array (102), the storage array controllers (112, 120) that are part of other storage arrays (104) in the storage system (100) may operate in a similar manner.

Each storage array (102, 104) depicted in FIG. 1 includes one or more write buffer devices (148, 152). Each write buffer device (148, 152) may be configured to receive, from the one of the storage array controller (106, 112, 118, 120), data to be stored in one or more of the storage devices (146, 150). Readers will appreciate that writing data to the write buffer device (148, 152) may be carried out more quickly than writing data to the storage device (146, 150). The storage array controllers (106, 112, 118, 120) may therefore be configured to effectively utilize the write buffer devices (148, 152) as a quickly accessible buffer for data destined to be written to one of the storage devices (146, 150). By utilizing the write buffer devices (148, 152) in such a way, the write latency experienced by users of the storage system (100) may be significantly improved relative to storage systems that do not include such write buffer devices (148, 152). The write latency experienced by users of the storage system (100) may be significantly improved relative to storage systems that do not include such write buffer devices (148, 152) because the storage array controllers (106, 112, 118, 120) may send an acknowledgment to the user of the storage system (100) indicating that a write request has been serviced once the data associated with the write request has been written to one of the write buffer devices (148, 152), even if the data associated with the write request has not yet been written to any of the storage devices (146, 150).

The presence of the write buffer devices (148, 152) may also improve the utilization of the storage devices (146, 150) as a storage array controller (106, 112, 118, 120) can accumulate more writes and organize writing to the storage devices (146, 150) for greater efficiency. Greater efficiency can be achieved, for example, as the storage array controller (106, 112, 118, 120) may have more time to perform deeper compression of the data, the storage array controller (106, 112, 118, 120) may be able to organize the data into write blocks that are in better alignment with the underlying physical storage on the storage devices (146, 150), the storage array controller (106, 112, 118, 120) may be able to perform deduplication operations on the data, and so on. Such write buffer devices (148, 152) effectively convert storage arrays of solid-state drives (e.g., "Flash drives") from latency limited devices to throughput limited devices. In such a way, the storage array controller (106, 112, 118, 120) may be given more time to better organize what is written to the storage devices (146, 150), but after doing so, are not then mechanically limited like disk-based arrays are.

Each storage array (102, 104) depicted in FIG. 1 includes one or more storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives, and the like.

The storage array controllers (106, 112) of FIG. 1 may be useful in migrating data in a storage array that includes a plurality of storage devices and a plurality of write buffer devices according to embodiments of the present disclosure. The storage array controllers (106, 112) may assist in migrating data in a storage array that includes a plurality of storage devices by: detecting, by the storage array, an occurrence of a write buffer device evacuation event associated with one or more write buffer devices; responsive to detecting the occurrence of the write buffer device evacuation event, determining, by the storage array, whether the storage array includes at least a predetermined amount of additional write buffer resources; responsive to determining that the storage array includes at least a predetermined amount of additional write buffer resources, reducing, by the storage array, write access to the one or more write buffer devices; determining whether the storage array includes at least a predetermined number of additional write buffer devices; blocking all write access to the one or more write buffer devices; blocking user-level write access to the one or more write buffer devices and permitting system-level write access to the one or more write buffer devices; receiving a user-initiated request to migrate data away from the one or more write buffer devices; determining whether the data stored on the one or more write buffer devices has become stale; responsive to determining that the data stored on the one or more write buffer devices has become stale, erasing the data stored on the one or more write buffer devices; and performing other steps as described in more detail below. Readers will appreciate that in some embodiments although the storage array controllers (106, 112) may perform the steps recited above, in other embodiments another apparatus such as a system management server may execute computer program instructions to carry out one or more of the steps recited above, either alone or in tandem with one of the storage array controllers (106, 112).

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Migrating data in a storage array that includes a plurality of storage devices and a plurality of write buffer devices in accordance with embodiments of the present disclosure is generally implemented with computers. In the system of FIG. 1, for example, all the computing devices (164, 166, 168, 170) and storage controllers (106, 112, 118, 120) may be implemented to some extent at least as computers. For further explanation, therefore, FIG. 2 sets forth a block diagram of a storage array controller (106) useful in migrating data in a storage array that includes a plurality of storage devices and a plurality of write buffer devices according to embodiments of the present disclosure.

Figure 2:
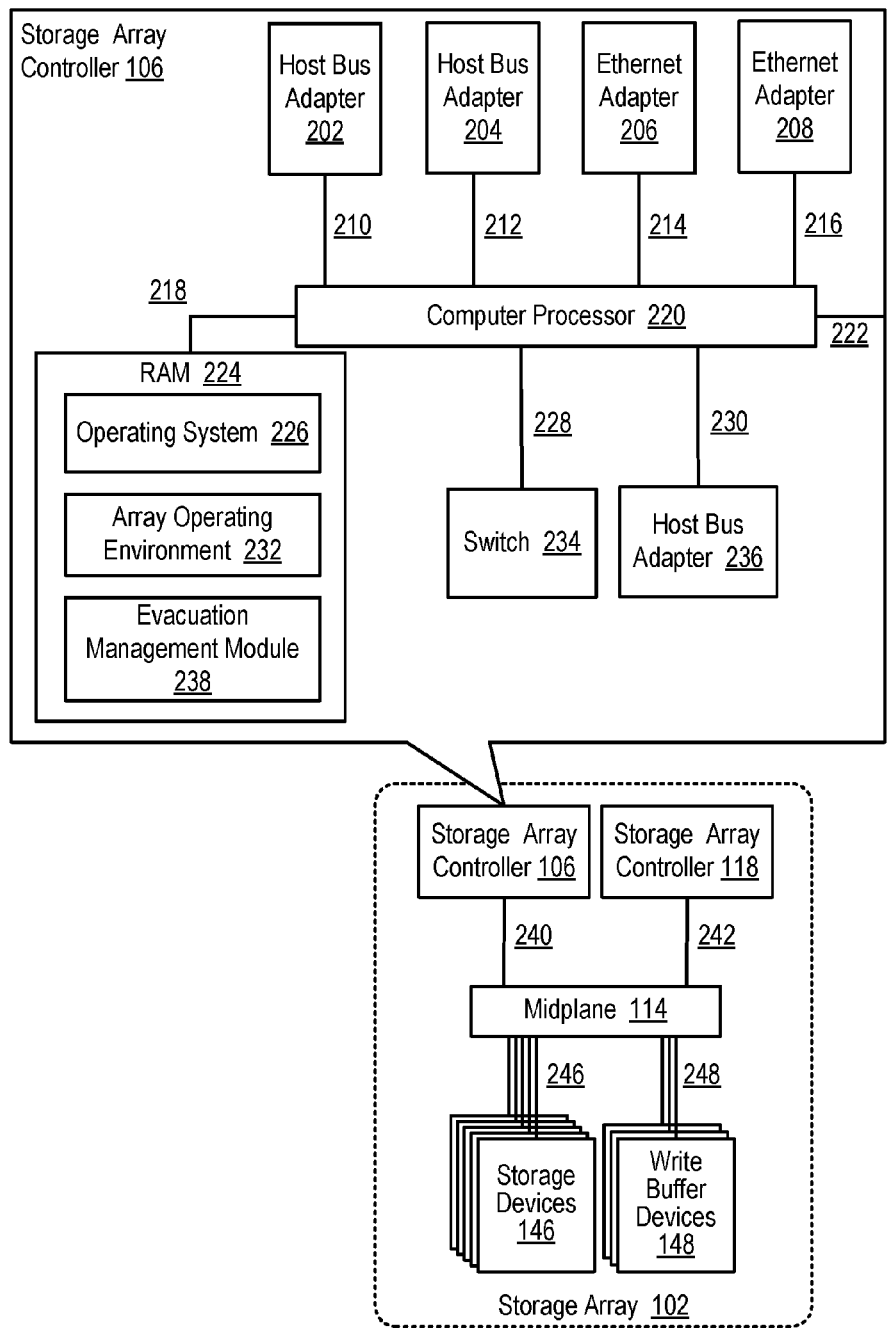
FIG. 2 sets forth a block diagram of a storage array controller useful in migrating data in a storage array that includes a plurality of storage devices and a plurality of write buffer devices according to embodiments of the present disclosure.

The storage array controllers (106, 118) depicted in FIG. 2 may be similar to the storage array controllers depicted in FIG. 1, as the storage array controllers (106, 118) of FIG. 2 may be communicatively coupled, via a midplane (114), to one or more storage devices (146) and to one or more write buffer devices (148) that are included as part of a storage array (102). The storage array controllers (106, 118) may be coupled to the midplane (114) via one or more data communications links (240, 242) and the midplane (114) may be coupled to the storage devices (146) and the memory buffer devices (148) via one or more data communications links (246, 248). The data communications links (240, 242, 246, 248) of FIG. 2 may be embodied, for example, as a Peripheral Component Interconnect Express ('PCIe') bus, as a SAS data communications link, and so on. Although only one of the storage array controllers (106) is depicted in detail, readers will appreciate that other storage array controllers (118) may include similar components. For ease of explanation, however, the detailed view of only one of the storage array controllers (106) will be described below.

The storage array controller (106) detailed in FIG. 2 can include at least one computer processor (220) or 'CPU' as well as random access memory ('RAM') (224). The computer processor (220) may be connected to the RAM (224) via a data communications link (218), which may be embodied as a high speed memory bus such as a Double-Data Rate 4 ('DDR4') bus. Although the storage array controller (106) detailed in FIG. 2 includes only a single computer processor, readers will appreciate that storage array controllers useful in migrating data in a storage array that includes a plurality of storage devices and a plurality of write buffer devices according to embodiments of the present disclosure may include additional computer processors. Likewise, although the storage array controller (106) detailed in FIG. 2 includes only RAM (224), readers will appreciate that storage array controllers useful in migrating data in a storage array that includes a plurality of storage devices and a plurality of write buffer devices according to embodiments of the present disclosure may include additional forms of computer memory such as flash memory.

The storage array controller (106) detailed in FIG. 2 includes an operating system (226) that is stored in RAM (224). Examples of operating systems useful in storage array controllers (106, 118) configured for migrating data in a storage array that includes a plurality of storage devices and a plurality of write buffer devices according to embodiments of the present disclosure include UNIX™, Linux™, Microsoft Windows™, and others as will occur to those of skill in the art. The operating system (226) depicted in FIG. 2 may be embodied, for example, as system software that manages computer hardware and software resources on the storage array controller (106).

The storage array controller (106) detailed in FIG. 2 also includes an array operating environment (232) that is stored in RAM (224). The array operating environment (232) may be embodied as one or more modules of computer program instructions used to enable the storage array controller (106) to service access requests that are directed to the storage array (102). The array operating environment (232) may be responsible for generating I/O requests (e.g., read requests, write requests) that are sent to the storage devices (146) or the write buffer devices (148). The array operating environment (232) may be further configured to perform various functions that result in more efficient utilization of the resources within the storage array (102). The array operating environment (232) may be configured, for example, to compress data prior to writing the data to one of the storage devices (146), to perform data deduplication operations, to pool data that is to be written to one of the storage devices (146) so that data may be written in blocks of a predetermined size, and so on.

The storage array controller (106) detailed in FIG. 2 also includes an evacuation management module (238), a module that includes computer program instructions useful in migrating data in a storage array that includes a plurality of storage devices and a plurality of write buffer devices according to embodiments of the present disclosure. The evacuation management module (238) may be executed on computer hardware such as the computer processor (220) of the storage array controller (106), thereby enabling the storage array controller (106) to migrate data by: detecting, by the storage array, an occurrence of a write buffer device evacuation event associated with one or more write buffer devices; responsive to detecting the occurrence of the write buffer device evacuation event, determining, by the storage array, whether the storage array includes at least a predetermined amount of additional write buffer resources; responsive to determining that the storage array includes at least a predetermined amount of additional write buffer resources, reducing, by the storage array, write access to the one or more write buffer devices; determining whether the storage array includes at least a predetermined number of additional write buffer devices; blocking all write access to the one or more write buffer devices; blocking user-level write access to the one or more write buffer devices and permitting system-level write access to the one or more write buffer devices; receiving a user-initiated request to migrate data away from the one or more write buffer devices; determining whether the data stored on the one or more write buffer devices has become stale; responsive to determining that the data stored on the one or more write buffer devices has become stale, erasing the data stored on the one or more write buffer devices; and performing other steps as described in more detail below.

The storage array controller (106) detailed in FIG. 2 also includes a plurality of host bus adapters (202, 204, 236) that are coupled to the computer processor (220) via a data communications link (210, 212, 230). Each host bus adapter (202, 204, 236) may be embodied as a module of computer hardware that connects the host system (i.e., the storage array controller) to other network and storage devices. Each of the host bus adapters (202, 204, 236) of FIG. 2 may be embodied, for example, as a Fibre Channel adapter that enables the storage array controller (106) to connect to a SAN, as a Target Channel Adapter, as a SCSI/Storage Target Adapter, and so on. The storage array controller also includes a plurality of Ethernet adapters (206, 208) that enables the storage array controller (106) to connect to a LAN, although readers will appreciate that other types of network adapters may be utilized in accordance with embodiments of the present disclosure. Each of the host bus adapters (202, 204, 236) and Ethernet adapters (206, 208) may be coupled to the computer processor (220) via a data communications link (210, 212, 214, 216, 230) such as, for example, a PCIe bus.

The storage array controller (106) detailed in FIG. 2 also includes a switch (234) that is coupled to the computer processor (220) via a data communications link (228). The switch (234) of FIG. 2 may be embodied as a computer hardware device that can create multiple endpoints out of a single endpoint, thereby enabling multiple devices to share what was initially a single endpoint. The switch (234) of FIG. 2 may be embodied, for example, as a PCIe switch that is coupled to a PCIe bus and presents multiple PCIe connection points to the midplane (114).

The storage array controller (106) of FIG. 2 may also include a data communications link (222) for coupling the storage array controller (106) to other storage array controllers (118). Such a data communications link (222) may be embodied, for example, as a QuickPath Interconnect ('QPI') interconnect, as PCIe non-transparent bridge ('NTB') interconnect, and so on. Readers will recognize that the components, protocols, adapters, and architectures described above and depicted in the figures are for illustration only, not limitation. Such a storage array controller may be implemented in a variety of different ways, each of which is well within the scope of the present disclosure.

Figure 3:
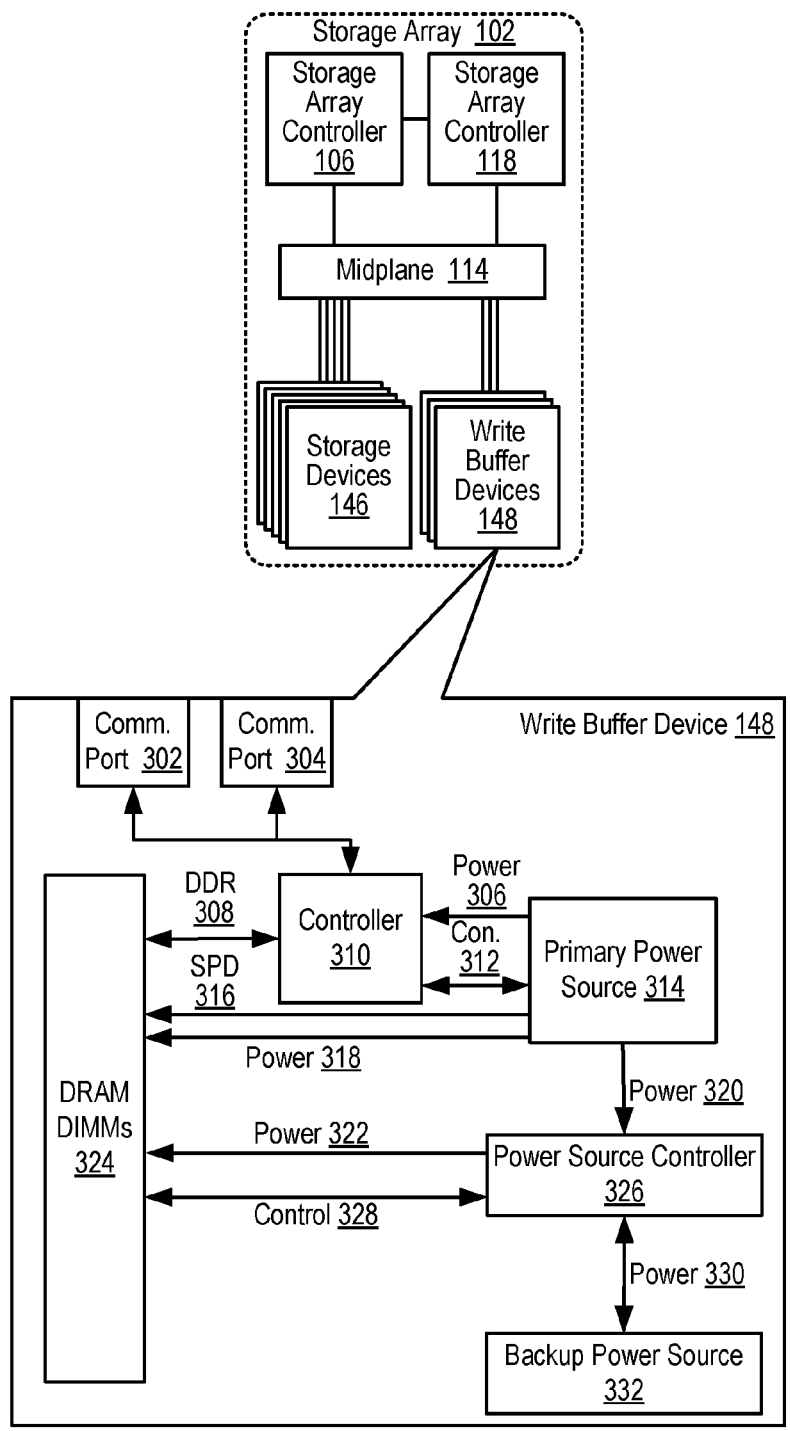
FIG. 3 sets forth a block diagram of a write buffer device useful in migrating data in a storage array that includes a plurality of storage devices and a plurality of write buffer devices according to embodiments of the present disclosure.

For further explanation, FIG. 3 sets forth a block diagram illustrating a write buffer device (148) useful in migrating data in a storage array that includes a plurality of storage devices and a plurality of write buffer devices according to embodiments of the present disclosure. The write buffer device (148) depicted in FIG. 3 is similar to the write buffer devices depicted in FIG. 1 and FIG. 2. The write buffer device (148) may be included in a storage array (102) that is similar to the storage arrays depicted in FIG. 1 and FIG. 2, as the storage array (102) may include a plurality of storage array controllers (106, 118) that are communicatively coupled to a plurality of storage devices (146) and also communicatively coupled to a plurality of write buffer devices (148) via a midplane (114).

The write buffer device (148) depicted in FIG. 3 includes two data communications ports (302, 304). The data communications ports (302, 304) depicted in FIG. 3 may be embodied as computer hardware for communicatively coupling the write buffer device (148) to a storage array controller (106, 118) via the midplane (114). For example, the write buffer device (148) may be communicatively coupled to the first storage array controller (106) via a first data communications port (302) and the write buffer device (148) may also be communicatively coupled to the second storage array controller (118) via a second data communications port (304). Although the write buffer device (148) depicted in FIG. 3 includes two data communications ports (302, 304), readers will appreciate that write buffer devices useful in migrating data in a storage array that includes a plurality of storage devices and a plurality of write buffer devices may include only one data communications port or, alternatively, additional data communications ports not depicted in FIG. 3.

The write buffer device (148) depicted in FIG. 3 also includes a controller (310). The controller (310) depicted in FIG. 3 may be embodied, for example, as computer hardware for receiving memory access requests (e.g., a request to write data to memory in the write buffer device) via the data communications ports (302, 304) and servicing such memory access requests. The controller (310) depicted in FIG. 3 may be embodied, for example, as an ASIC, as a microcontroller, and so on. The controller (310) depicted in FIG. 3 may be communicatively coupled the data communications ports (302, 304) for example, via a PCIe data communications bus.

The write buffer device (148) depicted in FIG. 3 also includes a plurality of DRAM memory modules, embodied in FIG. 3 as DRAM dual in-line memory modules ('DIMMs') (324). The DRAM DIMMs (324) depicted in FIG. 3 may be coupled to the controller (310) via a memory bus such as a DDR (308) memory bus such that the controller (310) can be configured to write data to the DRAM DIMMs (324) via the DDR (308) memory bus.

The write buffer device (148) depicted in FIG. 3 also includes a primary power source (314). The primary power source (314) may be embodied as computer hardware for providing electrical power to the computing components that are within the write buffer device (148). The primary power source (314) may be embodied, for example, as a switched-mode power supply that supplies electric energy to an electrical load by converting alternating current ('AC') power from a mains supply to a direct current ('DC') power, as a DC-to-DC converter that converts a source of DC from one voltage level to another, and so on. The primary power source (314) of FIG. 3 is coupled to the controller (310) via a power line (306) that the primary power source (314) can use to deliver power to the controller (310). The primary power source (314) of FIG. 3 may also be coupled to the DRAM DIMMs (324) via a power line (318) that the primary power source (314) can use to deliver power to the DRAM DIMMs (324). The primary power source (314) of FIG. 3 is also coupled to a power source controller (326) via a power (320) line that the primary power source (314) can use to deliver power to the power source controller (326). The primary power source (314) can monitor which components are receiving power through the use of one or more control lines (312), serial presence detect ('SPD') lines (316), or other mechanism for detecting the presence of a device and detecting that power is being provided to the device. Readers will appreciate that write devices useful for buffering data to be written to an array of non-volatile storage devices may include additional computing components not depicted in FIG. 3, each of which may also receive power from the primary power source (314).

The write buffer device (148) depicted in FIG. 3 also includes a backup power source (332). The backup power source (332) depicted in FIG. 3 represents a power source capable of providing power to the DRAM DIMMs (324) in the event that the primary power source (314) fails. In such a way, the DRAM DIMMs (324) may effectively serve as non-volatile memory, as a failure of the primary power source (314) will not cause the contents of the DRAM DIMMs (324) to be lost because the DRAM DIMMs (324) will continue to receive power from the backup power source (332). Such a backup power source (332) may be embodied, for example, as a supercapacitor.

The write buffer device (148) depicted in FIG. 3 also includes a power source controller (326). The power source controller (326) depicted in FIG. 3 may be embodied as a module of computer hardware configured to identify a failure of the primary power source (314) and to cause power to be delivered to the DRAM DIMMs (324) from the backup power source (332). In such an example, power may be delivered to the DRAM DIMMs (324) from the backup power source (332) via a first power (330) line between the power source controller (326) and the backup power source (332), as well as a second power (322) line between the backup power source controller (326) and the DRAM DIMMs (324). The backup power source controller (326) depicted in FIG. 3 may be embodied, for example, as an analog circuit, an ASIC, a microcontroller, and so on. The power source controller (326) can monitor whether the DRAM DIMMs (324) have power through the use of one or more control (328) lines that may be coupled to the DRAM DIMMs (324), as well as one or more control lines that may be coupled to the primary power source (314). In such an example, by exchanging signals between the DRAM DIMMs (324), the primary power source (314), and the power source controller (326), the power source controller (326) may identify whether power is being provided to the DRAM DIMMs (324) by the primary power source (314).

In the example depicted in FIG. 3, the controller (310) may be further configured to determine whether the primary power source (314) has failed. The controller (310) may determine whether the primary power source (314) has failed, for example, by receiving a signal over the control line (324) indicating that the primary power source (314) has failed or is failing, by detecting a lack of power from the primary power source (314), and so on. In such an example, the controller (310) may be coupled to the backup power source (332) or may have access to another source of power such that the controller (310) can remain operational if the primary power source (314) does fail.

In the example depicted in FIG. 3, the controller (310) may be further configured to initiate a transfer of data contained in the one or more DRAM DIMMs (324) to flash memory in the write buffer device (148) in response to determining that the primary power source (314) has failed. The controller (310) may initiate a transfer of data contained in the one or more DRAM DIMMs (324) to flash memory (not shown) in the write buffer device (148), for example, by signaling an NVDIMM to write the data contained in the one or more DRAM DIMMs (324) to flash memory on the NVDIMM.

As described above, the presence of write buffer devices (148) in the storage array (302) may allow the write latency experienced by users of the storage array (102) to be significantly improved relative to storage systems that do not include such write buffer devices (148). The write latency experienced by users of the storage array (102) may be significantly improved relative to storage systems that do not include such write buffer devices (148) because the storage array controllers (106, 118) may send an acknowledgment to the user of the storage array (102) indicating that a write request has been serviced once the data associated with the write request has been written to one of the write buffer devices (148), even if the data associated with the write request has not yet been written to any of the storage devices (146).

In the example depicted in FIG. 3, one of the storage array controllers (106, 118) may receive a request to write a particular data object to the storage array (102) from a user of the storage array (102). In such an example, the storage array controllers (106, 118) may issue a request to write the particular data object to one of the write buffer devices (148). The controller (310) within the write buffer device (148) may receive such a request from a storage array controller (106, 118) via the one or more data communications ports (302, 304). Such an instruction may include, for example, the location at which to write the data, the data to be written to the DRAM DIMMs (324), the identity of the host that issued the instruction, the identity of a user associated with the instruction, or any other information needed to service the instruction. In the example depicted in FIG. 3, the controller (310) may be further configured to write the data to the one or more DRAM DIMMs (324) in response to receiving such an instruction.

In the example depicted in FIG. 3, the controller (310) may be further configured to send an acknowledgment indicating that the data has been written to the array (102) of non-volatile storage devices in response to writing the data to the one or more DRAM DIMMs (324). The controller (310) may send the acknowledgment indicating that the data has been written to the storage array (102) in response to writing the data to the DRAM DIMMs (324) in the write buffer device (148). Readers will appreciate that although some forms of DRAM DIMMs (324) are considered to be volatile memory, because the DRAM DIMMs (324) are backed by redundant power sources (314, 332), writing the data to the DRAM DIMMs (324) in the write buffer device (148) may be treated the same as writing the data to traditional forms of non-volatile memory such as the storage devices (310). Furthermore, the DRAM DIMMs (324) in the write buffer device (148) can include one or more NVDIMMs. As such, once the data has been written to the DRAM DIMMs (324) in the write buffer device (148), an acknowledgement may be sent indicating that the data has been safely and persistently written to the storage array (102).

After the particular data object has been written to one of the write buffer devices (148), the storage array controller (106, 118) may subsequently issue a request to write the particular data object to one of the storage devices (146). As described above, prior to issuing the request to write the particular data object to one of the storage devices (146), the storage array controller (106, 118) may compress the particular data object, the storage array controller (106, 118) may be able to organize the particular data object and other data to be written to the storage devices (146) into write blocks that are in better alignment with the underlying physical storage on the storage devices (146), the storage array controller (106, 118) may be able to perform deduplication operations on the particular data object, and so on. Once the particular data object has been written to one of the storage devices (146), however, there is no need to retain the copy of the particular data object that was stored in the write buffer devices (148). To that end, once the storage array controller (106, 118) has determined that the particular data object has been written to one of the storage devices (146), the storage array controller (106, 118) may free the portion of memory within the write buffer device (148) that contains the particular data object. The storage array controller (106, 118) may free the portion of memory within the write buffer device (148) that contains the particular data object, for example, by adding the memory locations that contains the particular data object to a free list, by marking the particular data object as being dirty, and so on.

Figure 4:
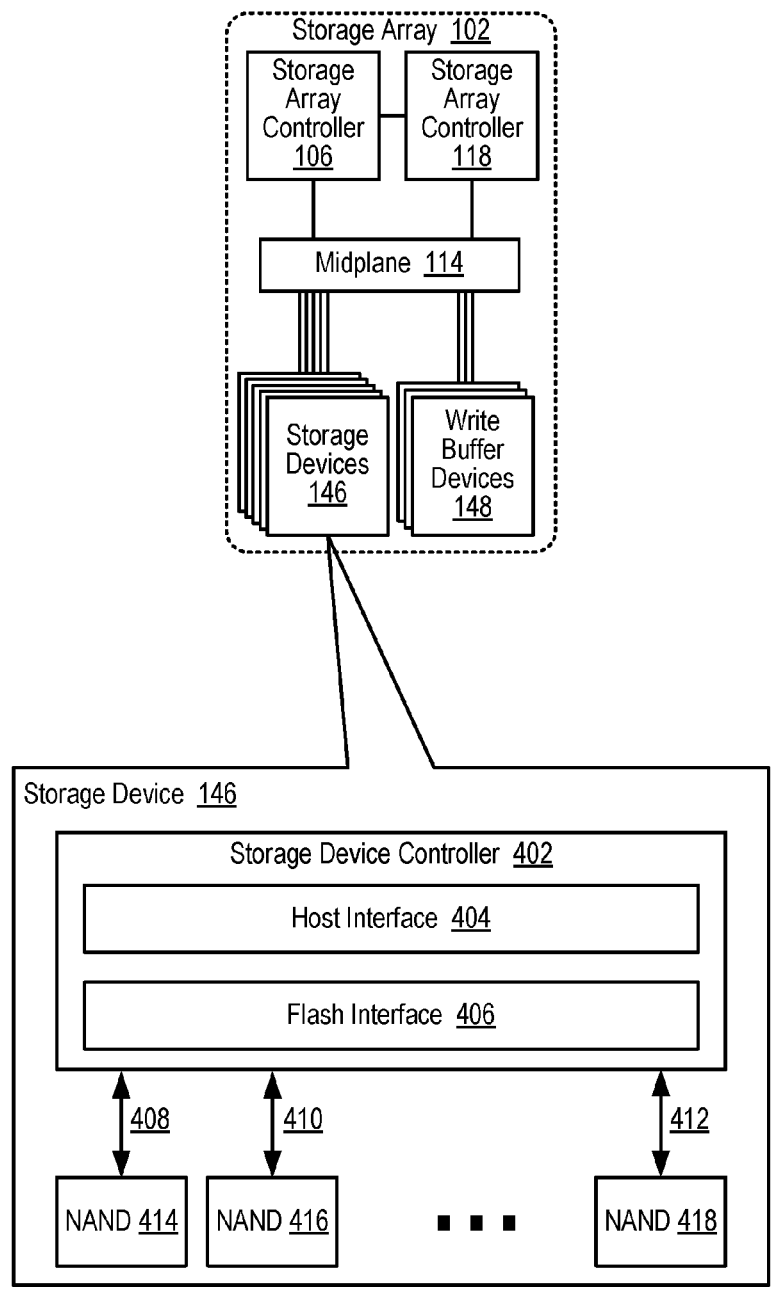
FIG. 4 sets forth a block diagram of a storage device useful in migrating data in a storage array that includes a plurality of storage devices and a plurality of write buffer devices according to embodiments of the present disclosure.

For further explanation, FIG. 4 sets forth a block diagram of a storage device (146) useful in migrating data in a storage array (102) that includes a plurality of storage devices (146) and a plurality of write buffer devices (148) according to embodiments of the present disclosure. The storage devices (146) depicted in FIG. 4 may be similar to the storage device (146) depicted in FIGS. 1-3. The storage devices (146) may be included in a storage array (102) that is similar to the storage arrays depicted in FIGS. 1-3, as the storage array (102) may include a plurality of storage array controllers (106, 118) that are communicatively coupled to a plurality of storage devices (146) and also communicatively coupled to a plurality of write buffer devices (148) via a midplane (114) Although only one of the storage devices (146) in the storage array (102) is depicted in detail, readers will appreciate that the remaining storage devices (146) in the storage array (102) may include similar components.

The storage device (146) depicted in FIG. 4 may be embodied, for example, as an SSD that includes a storage device controller (402) that is coupled to one or more modules of NAND (414, 416, 418) flash memory via one or more memory channels (408, 410, 412). The modules of NAND (414, 416, 418) flash memory may include, for example, an array of floating-gate transistors that each act as a memory cell. Such memory cells may be embodied, for example, as single level cell ('SLC') devices where each memory cell stores one bit of information, as multi-level cell ('MLC') devices where each memory cell stores two bits of information, and so on. In such an example, the memory cells may grouped into a NAND string that includes 32 memory cells, 64 memory cells, 128 memory cells, or some other number of memory cells connected in series.

The storage device controller (402) depicted in FIG. 4 may be embodied, for example, as an embedded processor that executes firmware-level code and incorporates the electrical components that bridge the one or more modules of NAND (414, 416, 418) flash memory to a host system such as the storage array controllers (106, 118). In the example depicted in FIG. 4, the electrical components that bridge the one or more modules of NAND (414, 416, 418) flash memory to a host system such as the storage array controllers (106, 118) are depicted as a host interface (404) and a flash interface (406). The host interface (404) may be embodied, for example, as a module of computer hardware that includes firmware for implementing data communications using various protocols such as PCIe, SAS, SATA, or other protocol. The host interface (404) therefore enables both logical and electrical interoperability between the storage device and a host system such as the storage array controllers (106, 118). The host interface (404) may further be configured to decode a command sequence received from the storage array controllers (106, 118) and handles the flow of data to and from the storage device (146). The flash interface (406) may be embodied, for example, as a module of computer hardware that includes firmware for writing data to and reading data from the one or more modules of NAND (414, 416, 418) flash memory. The flash interface (406) may be configured to send signals to the various pins that are included as part of the one or more modules of NAND (414, 416, 418) flash memory, thereby facilitating an electrical and logical connection between the storage device controller (402) and the one or more modules of NAND (414, 416, 418) flash memory.

The storage device controller (402) may be configured to perform many functions, including performing error-correcting code ('ECC') functions, wear leveling functions, bad block mapping functions, read scrubbing and read disturb management functions, read and write caching functions, garbage collection functions, encryption functions, and so on. Readers will appreciate that storage device controllers (402) that are included in storage devices (146) that may be utilized in accordance with embodiments of the present disclosure may be configured to perform only a subset of the functions listed above, all of the functions listed above, additional functions not listed above, or any combination thereof.

Figure 5:
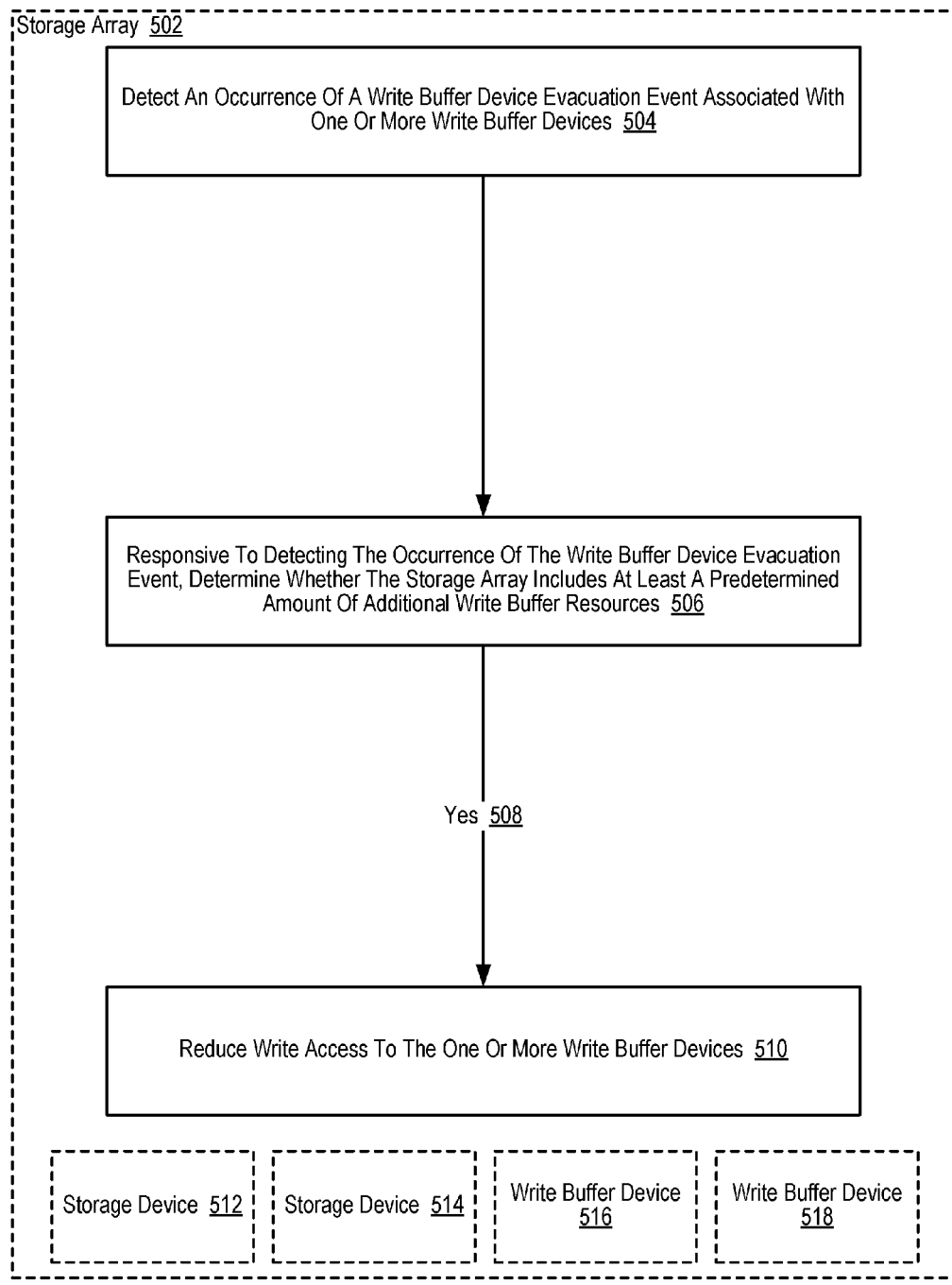
FIG. 5 sets forth a flow chart illustrating an example method for migrating data in a storage array that includes a plurality of storage devices according to embodiments of the present disclosure.

For further explanation, FIG. 5 sets forth a flow chart illustrating an example method for migrating data in a storage array (502) that includes a plurality of storage devices (512, 514) and plurality of write buffer devices (516, 518) according to embodiments of the present disclosure. Although depicted in less detail, the storage array (502) depicted in FIG. 5 may be similar to the storage arrays described above with reference to FIGS. 1-4. The storage array (502) may therefore include a plurality of storage array controllers, storage devices, write buffer devices, and so on. Readers will appreciate that the storage array (502) depicted in FIG. 5 may also be part of a larger storage system that includes a plurality of storage arrays.

The example method depicted in FIG. 5 includes detecting (504), by the storage array (502), an occurrence of a write buffer device evacuation event associated with one or more write buffer devices (516, 518). A write buffer device evacuation event may indicate that the one or more write buffer devices (516, 518) should no longer be written to as the one or more write buffer devices (516, 518) have been targeted for removal from the storage array (502). The write buffer device evacuation event may be embodied, for example, as an event that is generated in response to a system administrator or other administrative entity indicating that the one or more write buffer devices (516, 518) have been targeted for removal from the storage array (502). The system administrator or other administrative entity may indicate that the one or more write buffer devices (516, 518) are targeted for removal from the storage array (502), for example, through the use of a special purpose user interface (e.g., a GUI presented on a display screen) that presents an inventory of the write buffer devices (516, 518) that are included in the storage array (502) and that also allows the user of the special purpose user interface to select one or more write buffer devices (516, 518) that are to be targeted for removal from the storage array (502).

In the example method depicted in FIG. 5, detecting (504) an occurrence of a write buffer device evacuation event associated with one or more write buffer devices (516, 518) may be carried out by a special purpose module of computer program instructions that is executing on computer hardware within the storage array (502). Such a special purpose module of computer program instructions may be a standalone module or may be included within a larger module such as, for example, the array operating environment described above with reference to FIG. 2. Such a special purpose module of computer program instructions may be executing, for example, on one or more computer processors within an array management server, on one or more computer processors within a storage array controller that is similar to the storage array controllers described above, or on other computer hardware within the storage array (502).

Readers will appreciate that one or more write buffer devices (516, 518) may be targeted for removal from the storage array (502) for a variety of reasons. For example, the more write buffer devices (516, 518) may utilize relatively old memory devices that have a smaller storage capacity than relatively new memory devices that may be available as replacements for the relatively old memory devices. Alternatively, the write buffer devices (516, 518) may utilize relatively old memory devices that have higher access latencies and can't perform as many IOPS as relatively new memory devices that may be available as replacements for the relatively old memory devices. For example, the write buffer devices (516, 518) may include DDR3 DRAM memory devices that can be replaced with DDR4 DRAM memory devices that operate at higher frequencies, lower power consumption levels, and so on. The one or more write buffer devices (516, 518) may therefore be targeted for removal from the storage array (502) as part of an upgrade to the storage array (502). Readers will appreciate that the one or more write buffer devices (516, 518) may be targeted for removal from the storage array (502) for other reasons, and readers will further appreciate that the one or more write buffer devices (516, 518) may be targeted for removal from the storage array (502) in spite of the fact that the one or more write buffer devices (516, 518) may still be properly functioning with no indication that a failure of the one or more write buffer devices (516, 518) is imminent.

The example method depicted in FIG. 5 also includes determining (506), by the storage array (502), whether the storage array (502) includes at least a predetermined amount of additional write buffer resources. The additional write buffer resources may be embodied, for example, as write buffer resources provided by one or more write buffer devices that are not associated with the write buffer device evacuation event. The additional write buffer resources therefore represent write buffer resources that are provided by write buffer devices that have not been identified as write buffer devices that are targeted for removal from the storage array (502). Consider an example in which the storage array (502) detects (504) a write buffer device evacuation event that is associated with a first write buffer device (516). In such an example, a second write buffer device (518) would provide additional write buffer resources, as the second write buffer device (518) is not targeted for removal from the storage array (502).

In the example method depicted in FIG. 5, the predetermined amount of additional write buffer resources may represent a threshold amount of write buffer resources that should be provided to users of the storage array (502). In view of the fact that one or more write buffer devices (516, 518) may be targeted for removal from the storage array (502) as the result of write buffer device evacuation event, the amount of write buffer resources that can be provided by the additional write buffer devices may be compared to the threshold amount of write buffer resources that should be provided to users of the storage array (502), to verify that the storage array (502) could continue to provide the threshold amount of write buffer resources that should be provided to users of the storage array (502), even if the one or more write buffer devices (516, 518) that have been targeted for removal from the storage array (502) are actually removed from the storage array (502). If, in the absence of the one or more write buffer devices (516, 518) that have been targeted for removal from the storage array (502), the storage array (502) could not continue to provide the threshold amount of write buffer resources that should be provided to users of the storage array (502), servicing of the write buffer device evacuation event may be delayed or denied. In the example method depicted in FIG. 5, the predetermined amount of additional write buffer resources may be expressed, for example, in terms of an amount of available memory on the write buffer devices that are not associated with any write buffer device evacuation events, in terms of the number of IOPS that may be serviced by the write buffer devices that are not associated with any write buffer device evacuation events, as the number of write buffer devices that should remain in the storage array (502), and so on.

In the example method depicted in FIG. 5, determining (506) whether the storage array (502) includes at least a predetermined amount of additional write buffer resources may be carried out by a special purpose module of computer program instructions that is executing on computer hardware within the storage array (502). Such a special purpose module of computer program instructions may be a standalone module or may be included within a larger module such as, for example, the array operating environment described above with reference to FIG. 2. Such a special purpose module of computer program instructions may be executing, for example, on one or more computer processors within an array management server, on one or more computer processors within a storage array controller that is similar to the storage array controllers described above, or on other computer hardware within the storage array (502).

In the example method depicted in FIG. 5, determining (506) whether the storage array (502) includes at least a predetermined amount of additional write buffer resources may be carried out by identifying write buffer devices that are not associated with any write buffer device evacuation events and determining the amount of write buffer resources that may be provided to users of the storage array (502) by the write buffer devices that are not associated with any write buffer device evacuation events. In such an example, the amount of write buffer resources that may be provided to users of the storage array (502) by the write buffer devices that are not associated with any write buffer device evacuation events may be compared to the predetermined amount of additional write buffer resources. In the example method depicted in FIG. 5, determining (506) whether the storage array (502) includes at least a predetermined amount of additional write buffer resources may be carried out in response to detecting the occurrence of the write buffer device evacuation event.

The example method depicted in FIG. 5 also includes reducing (510), by the storage array (502), write access to the one or more write buffer devices (516, 518). Reducing (510) write access to the one or more write buffer devices (516, 518) may be carried out, for example, by preventing any additional data from being written to the one or more write buffer devices (516, 518), by limiting the number of write accesses that may be directed to the one or more write buffer devices (516, 518) to a predetermined value, and so on. Readers will appreciate that by reducing (510) write access to the one or more write buffer devices (516, 518), the storage array (502) may cause the contents of the one or more write buffer devices (516, 518) to become stale over time as all of the data stored in the one or more write buffer devices (516, 518) may be written to the storage devices (512, 514). Once the contents of the one or more write buffer devices (516, 518) have become stale and all of the data stored in the one or more write buffer devices (516, 518) is also stored in the storage devices (512, 514), the one or more write buffer devices (516, 518) may be safely removed from the storage array (502) without resulting in data loss.

Reducing (510) write access to the one or more write buffer devices (516, 518) may be carried out through the use of a special purpose module of computer program instructions that is executing on computer hardware within the storage array (502). Such a special purpose module of computer program instructions may be a standalone module or may be included within a larger module such as, for example, the array operating environment described above with reference to FIG. 2. Such a special purpose module of computer program instructions may be executing, for example, on one or more computer processors within an array management server, on one or more computer processors within a storage array controller that is similar to the storage array controllers described above, or on other computer hardware within the storage array (502). In such an example, the special purpose module of computer program instructions that is executing on computer hardware within the storage array (502) may be configured to notify each of the storage array controllers in the storage array (502) that write access to the one or more write buffer devices (516, 518) has been reduced (510), so that the storage array controllers in the storage array (502) may cease (or limit) issuing write requests to the one or more write buffer devices (516, 518). In the example method depicted in FIG. 5, reducing (510) write access to the one or more write buffer devices (516, 518) may be carried out in response to affirmatively (508) determining that the storage array (502) includes at least a predetermined amount of write buffer resources in addition to the one or more write buffer devices (516, 518).

Figure 6:
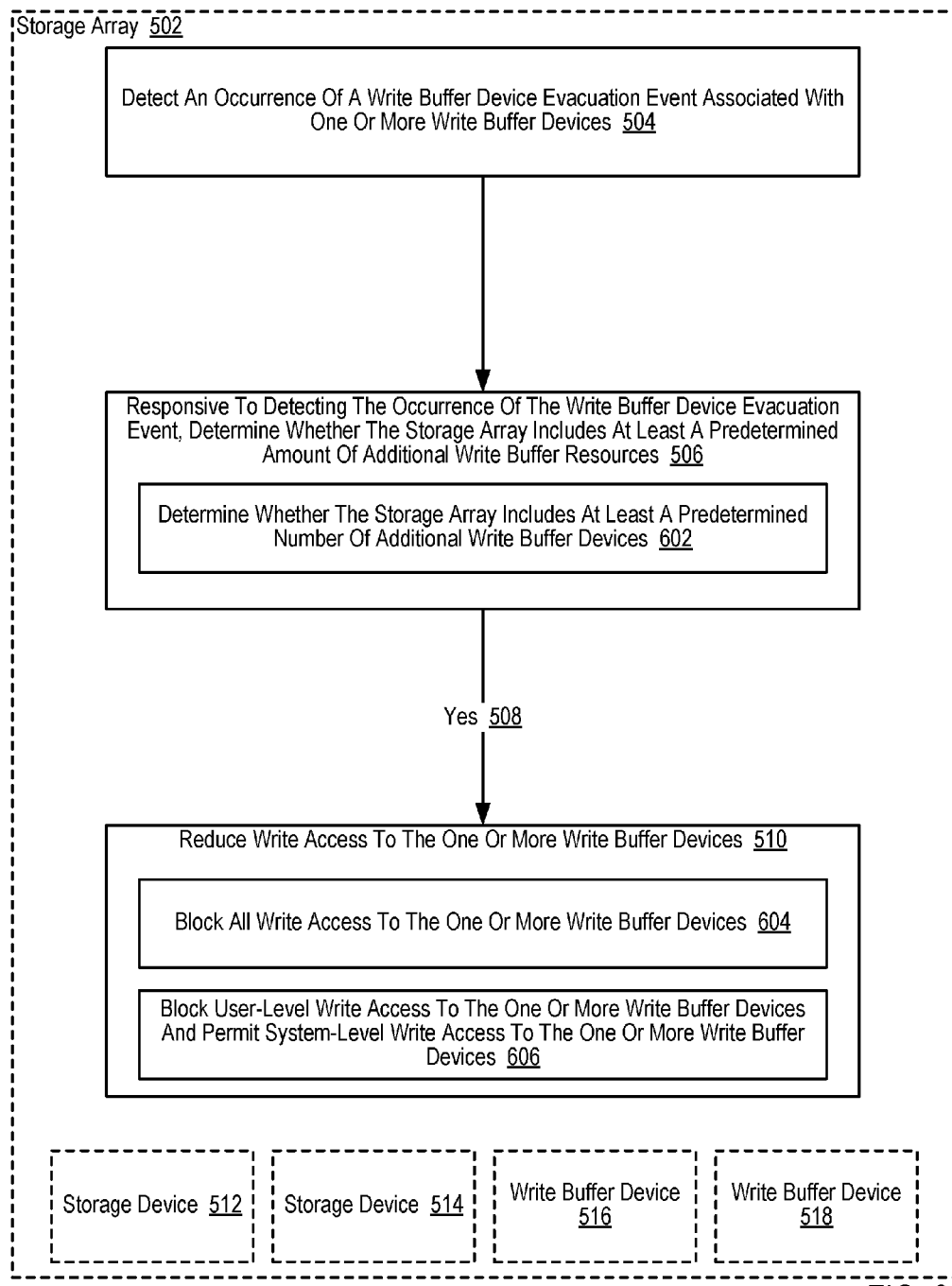
FIG. 6 sets forth a flow chart illustrating an additional example method for migrating data in a storage array that includes a plurality of storage devices according to embodiments of the present disclosure.

For further explanation, FIG. 6 sets forth a flow chart illustrating an additional example method for migrating data in a storage array that includes a plurality of storage devices according to embodiments of the present disclosure. The example method depicted in FIG. 6 is similar to the example method depicted in FIG. 5, as the example method depicted in FIG. 6 also includes detecting (504) an occurrence of a write buffer device evacuation event associated with one or more write buffer devices (516, 518), determining (506) whether the storage array (502) includes at least a predetermined amount of additional write buffer resources, and reducing (510) write access to the one or more write buffer devices (516, 518).

In the example method depicted in FIG. 6, determining (506) whether the storage array (502) includes at least a predetermined amount of additional write buffer resources can include determining (602) whether the storage array (502) includes at least a predetermined number of additional write buffer devices. The additional write buffer devices may be embodied, for example, as write buffer devices that are not associated with any write buffer device evacuation events and therefore have not been targeted for removal from the storage array (502). In such an example, a system administrator or other user may set the predetermined number of additional write buffer devices to a value that ensures that users of the storage array (502) will have access to a sufficient amount of write buffer resources, even in the absence of the one or more write buffer devices (516, 518) that have been targeted for removal from the storage array (502). In the example method depicted in FIG. 6, determining (602) whether the storage array (502) includes at least a predetermined number of additional write buffer devices may be carried out, for example, by identifying all write buffer devices in the storage array (502), determining the number of the write buffer devices in the storage array (502) are not associated with a write buffer device evacuation event, and comparing the number of the write buffer devices in the storage array (502) are not associated with a write buffer device evacuation event to the predetermined number of additional write buffer devices. If the number of the write buffer devices in the storage array (502) are not associated with a write buffer device evacuation event is greater than or equal to the predetermined number of additional write buffer devices, the storage array (502) does include at least the predetermined amount of additional write buffer resources necessary to proceed with the process of removing the one or more write buffer devices (516, 518) that have been targeted for removal from the storage array (502).

In the example method depicted in FIG. 6, reducing (510) write access to the one or more write buffer devices (516, 518) can include blocking (604) all write access to the one or more write buffer devices (516, 518). Blocking (604) all write access to the one or more write buffer devices (516, 518) may be carried out, for example, by each of the storage array controllers in the storage array (502) ceasing to issue write operations to the one or more write buffer devices (516, 518). In such an example, each storage array controller may maintain a list or other data structure that identifies all write buffer devices in the storage array (502) that should not be utilized to service write operations. Because the storage array controller is responsible for directing all access requests to the write buffer devices (516, 518) in the storage array (502), the storage array controller may ultimately enforce a policy to block (604) all write access to the one or more write buffer devices (516, 518).

In the example method depicted in FIG. 6, reducing (510) write access to the one or more write buffer devices (516, 518) may alternatively include blocking (606) user-level write access to the one or more write buffer devices (516, 518) and permitting system-level write access to the one or more write buffer devices (516, 518). Blocking (606) user-level write access to the one or more write buffer devices (516, 518) may be carried out, for example, by each of the storage array controllers ceasing to utilize a write buffer device (516, 518) that is associated with a write buffer device evacuation event as a buffer for servicing write requests received by the storage array controller. As such, when a storage array controller receives a request to write data from a user of the storage array, the storage array may buffer such data (i.e., user-level data) utilizing write buffer devices (516, 518) that are not associated with a write buffer device evacuation event and therefore have not been targeted for removal from the storage array (502).

Readers will appreciate that although the storage array controllers may block (606) user-level write access to the one or more write buffer devices (516, 518), however, the storage array controllers may still need to write system-level data to the one or more write buffer devices (516, 518). Consider an example in which, for each piece of user-level data stored in the one or more write buffer devices (516, 518), system-level data is also maintained in the one or more write buffer devices (516, 518). Such system-level data may include, for example, metadata that identifies whether the associated user data has also been written to one of the storage devices (512, 514) in the storage array (502), a list of clean memory regions, a list of dirty memory regions, and so on. In such an example, even though write access to the one or more write buffer devices (516, 518) is reduced (510), the storage array controller may still need to perform write operations that are directed to the one or more write buffer devices (516, 518) so that the storage array controller can update such system-level data as each piece of user-level data is written to one of the storage devices (512, 514) in the storage array (502). As such, reducing (510) write access to the one or more write buffer devices (516, 518) may be carried out by blocking (606) user-level write access to the one or more write buffer devices (516, 518) while still permitting system-level write access to the one or more write buffer devices (516, 518).

Figure 7:
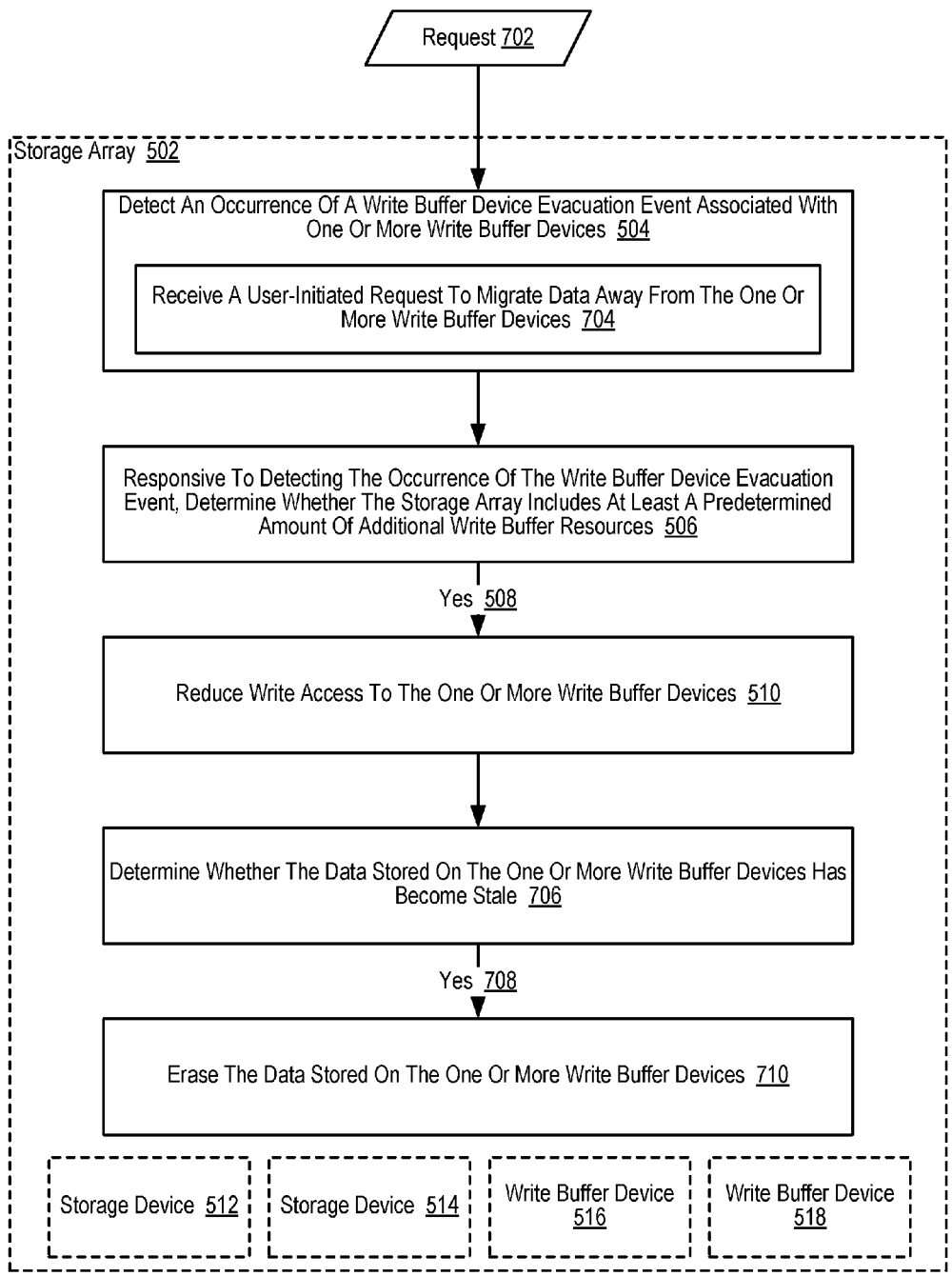
FIG. 7 sets forth a flow chart illustrating an additional example method for migrating data in a storage array that includes a plurality of storage devices according to embodiments of the present disclosure.

For further explanation, FIG. 7 sets forth a flow chart illustrating an additional example method for migrating data in a storage array that includes a plurality of storage devices according to embodiments of the present disclosure. The example method depicted in FIG. 7 is similar to the example method depicted in FIG. 5, as the example method depicted in FIG. 7 also includes detecting (504) an occurrence of a write buffer device evacuation event associated with one or more write buffer devices (516, 518), determining (506) whether the storage array (502) includes at least a predetermined amount of additional write buffer resources, and reducing (510) write access to the one or more write buffer devices (516, 518).

In the example method depicted in FIG. 7, detecting (504) an occurrence of a write buffer device evacuation event associated with one or more write buffer devices (516, 518) can include receiving (704) a user-initiated request (702) to migrate data away from the one or more write buffer devices (516, 518). The user-initiated request (702) to migrate data away from the one or more write buffer devices (516, 518) may be received (704), for example, through the use a user interface (e.g., a GUI presented on a display screen) that presents an inventory of the write buffer devices (516, 518) that are included in the storage array (502) and that also allows the user of the user interface to select one or more write buffer devices (516, 518) that are to be designated for removal from the storage array (502). Readers will appreciate that a user-initiated request (702) to migrate data away from the one or more write buffer devices (516, 518) may be received (704) in other ways in other embodiments.

The example method depicted in FIG. 7 also includes determining (706) whether data stored on the one or more write buffer devices (516, 518) has become stale. Data stored on the one or more write buffer devices (516, 518) may become stale, for example, because the data has also been written to one or more of the storage devices (512, 514) in the storage array (502). In such an example, the data is stale in the sense that it no longer needs to be stored on write buffer devices (516, 518), given that the data is stored in persistent memory in the form of the one or more of the storage devices (512, 514).

In the example method depicted in FIG. 7, determining (706) whether data stored on the one or more write buffer devices (516, 518) has become stale may be carried out through the use of various mechanisms. Determining (706) whether data stored on the one or more write buffer devices (516, 518) has become stale may be carried out, for example, by examining a list or other data structure that stores information identifying each piece of data stored on the one or more write buffer devices (516, 518) as well as information describing whether each piece of data has also been stored on the one or more of the storage devices (512, 514). In such an example, a storage array controller or other entity may update such a list or other data structure each time a piece of data is written to the one or more of the storage devices (512, 514). In an alternative embodiment, metadata that is stored on the one or more write buffer devices (516, 518) themselves may be examined to determine (706) whether data stored on the one or more write buffer devices (516, 518) has become stale. In such an example, a storage array controller or other entity may update such metadata each time a piece of data is written to the one or more of the storage devices (512, 514).

The example method depicted in FIG. 7 also includes, responsive to affirmatively (708) determining that the data stored on the one or more write buffer devices (516, 518) has become stale, erasing (710) the data stored on the one or more write buffer devices (516, 518). In the example method depicted in FIG. 7, erasing (710) the data stored on the one or more write buffer devices (516, 518) may be carried out by writing null values to each memory location within the one or more write buffer devices (516, 518), by executing an erase operation on each memory location within the one or more write buffer devices (516, 518), and so on. Erasing (710) the data stored on the one or more write buffer devices (516, 518) may be carried out once the data stored on the one or more write buffer devices (516, 518) has been successfully migrated to the one or more of the storage devices (512, 514) or once the data stored on the one or more write buffer devices (516, 518) has been successfully migrated to the another write buffer device that is not targeted for removal form the storage array (502). Erasing (710) the data stored on the one or more write buffer devices (516, 518) may be carried out as a data protection measure, to ensure that once a write buffer device (516, 518) that is targeted for removal from the storage array (502) has actually been removed from the storage array (502), client data that resides on such a write buffer device (516, 518) will not be accessed.

Readers will appreciate that although the example methods described above are depicted in a way where a series of steps occurs in a particular order, no particular ordering of the steps is required unless explicitly stated. Example embodiments are described largely in the context of a fully functional computer system for migrating data in a storage array that includes a plurality of storage devices and a plurality of write buffer devices. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

The present disclosure may be embodied as an apparatus, a method, a computer program product, and so on. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, a read-only memory (ROM), an erasable programmable read-only memory (EPROM or Flash memory), a static random access memory (SRAM), a portable compact disc read-only memory (CD-ROM), a digital versatile disk (DVD), a memory stick, and so on. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a wide area network (WAN), or the connection may be made to an external computer (for example, through the Internet using an Internet Service Provider). In some embodiments, electronic circuitry including, for example, programmable logic circuitry, FPGAs, or PLAs may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), computer program products, and so on. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of apparatuses, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense.

What is claimed is:

1. A method of migrating data in a storage array that includes a plurality of storage devices and a plurality of write buffer devices, the method comprising:
   detecting, by the storage array, an occurrence of a write buffer device evacuation event associated with one or more write buffer devices;
   responsive to detecting the occurrence of the write buffer device evacuation event, determining, by the storage array, whether the storage array includes at least a predetermined amount of additional write buffer resources; and
   responsive to determining that the storage array includes at least a predetermined amount of additional write buffer resources, reducing, by the storage array, write access to the one or more write buffer devices.

2. The method of claim 1 wherein determining whether the storage array includes at least a predetermined amount of additional write buffer resources further comprises determining whether the storage array includes at least a predetermined number of additional write buffer devices.

3. The method of claim 1 wherein reducing write access to the one or more write buffer devices further comprises blocking all write access to the one or more write buffer devices.

4. The method of claim 1 wherein reducing write access to the one or more write buffer devices further comprises blocking user-level write access to the one or more write buffer devices and permitting system-level write access to the one or more write buffer devices.

5. The method of claim 1 wherein detecting the occurrence of the write buffer device evacuation event further comprises receiving a user-initiated request to migrate data away from the one or more write buffer devices.

6. The method of claim 1 further comprising determining whether data stored on the one or more write buffer devices has become stale.

7. The method of claim 6 further comprising, responsive to determining that the data stored on the one or more write buffer devices has become stale, erasing the data stored on the one or more write buffer devices.

8. An apparatus for migrating data in a storage array that includes a plurality of storage devices and a plurality of write buffer devices, the apparatus comprising a computer processor and a computer memory, the computer memory including computer program instructions that, when executed by the computer processor, cause the apparatus to carry out the steps of:
   detecting, by the storage array, an occurrence of a write buffer device evacuation event associated with one or more write buffer devices;
   responsive to detecting the occurrence of the write buffer device evacuation event, determining, by the storage array, whether the storage array includes at least a predetermined amount of additional write buffer resources; and
   responsive to determining that the storage array includes at least a predetermined amount of additional write buffer resources, reducing, by the storage array, write access to the one or more write buffer devices.

9. The apparatus of claim 8 wherein determining whether the storage array includes at least a predetermined amount of additional write buffer resources further comprises determining whether the storage array includes at least a predetermined number of additional write buffer devices.

10. The apparatus of claim 8 wherein reducing write access to the one or more write buffer devices further comprises blocking all write access to the one or more write buffer devices.

11. The apparatus of claim 8 wherein reducing write access to the one or more write buffer devices further comprises blocking user-level write access to the one or more write buffer devices and permitting system-level write access to the one or more write buffer devices.

12. The apparatus of claim 8 wherein detecting the occurrence of the write buffer device evacuation event further comprises receiving a user-initiated request to migrate data away from the one or more write buffer devices.

13. The apparatus of claim 8 further comprising computer program instructions that, when executed by the computer processor, cause the apparatus to carry out the step of determining whether data stored on the one or more write buffer devices has become stale.

14. The apparatus of claim 13 further comprising computer program instructions that, when executed by the computer processor, cause the apparatus to carry out the step of, responsive to determining that the data stored on the one or more write buffer devices has become stale, erasing the data stored on the one or more write buffer devices.

15. A computer program product for migrating data in a storage array that includes a plurality of storage devices and a plurality of write buffer devices, the computer program product disposed on a non-transitory computer readable storage medium, the computer program product including computer program instructions that, when executed by a computer processor, cause the computer processor to carry out the steps of:
   detecting, by the storage array, an occurrence of a write buffer device evacuation event associated with one or more write buffer devices;
   responsive to detecting the occurrence of the write buffer device evacuation event, determining, by the storage array, whether the storage array includes at least a predetermined amount of additional write buffer resources; and
   responsive to determining that the storage array includes at least a predetermined amount of additional write buffer resources, reducing, by the storage array, write access to the one or more write buffer devices.

16. The computer program product of claim 15 wherein determining whether the storage array includes at least a predetermined amount of additional write buffer resources further comprises determining whether the storage array includes at least a predetermined number of additional write buffer devices.

17. The computer program product of claim 15 wherein reducing write access to the one or more write buffer devices further comprises blocking all write access to the one or more write buffer devices.

18. The computer program product of claim 15 wherein reducing write access to the one or more write buffer devices further comprises blocking user-level write access to the one or more write buffer devices and permitting system-level write access to the one or more write buffer devices.

19. The computer program product of claim 15 wherein detecting the occurrence of the write buffer device evacuation event further comprises receiving a user-initiated request to migrate data away from the one or more write buffer devices.

20. The computer program product of claim 15 further comprising computer program instructions that, when executed by the computer processor, cause the computer processor to carry out the step of determining whether data stored on the one or more write buffer devices has become stale.

\* \* \* \* \*